(12) United States Patent
Markham

(10) Patent No.: US 6,546,896 B1
(45) Date of Patent: Apr. 15, 2003

(54) ANIMAL TOY

(75) Inventor: Joseph P. Markham, Arvada, CO (US)

(73) Assignee: Bounce, Inc., Golden, CO (US)

( * ) Notice: Subject to any disclaimer, the term of this patent is extended or adjusted under 35 U.S.C. 154(b) by 0 days.

(21) Appl. No.: 09/556,057

(22) Filed: Apr. 21, 2000

(51) Int. Cl.$^7$ .............................................. A01K 29/00
(52) U.S. Cl. .................................... 119/709; 119/710
(58) Field of Search ............................ 119/709, 710, 119/707, 711

(56) References Cited

U.S. PATENT DOCUMENTS

| | | | |
|---|---|---|---|
| 1,149,170 A | 8/1915 | Allis | |
| 2,610,851 A | 9/1952 | Jones | 272/8 |
| D188,179 S | 6/1960 | Tay | D12/2 |
| 3,871,334 A | 3/1975 | Axelrod | 119/29.5 |
| 4,513,014 A * | 4/1985 | Edwards | 119/710 |
| 4,557,219 A | 12/1985 | Edwards | 119/29.5 |
| 4,674,444 A | 6/1987 | Axelrod | 119/29.5 |
| D373,859 S | 9/1996 | Markham et al. | 119/707 |
| 5,595,142 A * | 1/1997 | Chill | 119/710 |
| 5,832,877 A | 11/1998 | Markham | 119/710 |
| 5,865,146 A | 2/1999 | Markham | 119/707 |
| 6,116,191 A * | 9/2000 | Suchowski et al. | 119/707 |
| 6,202,598 B1 * | 3/2001 | Willinger | 119/709 |

FOREIGN PATENT DOCUMENTS

WO    WO97/47186    12/1997

OTHER PUBLICATIONS

Publication entitled "Recipe for the 'Almost Perfect' Dog".
Publication entitled "Kong Tips—Good Medicine for Bad Behavior", Apr., 1995.
PAckage sample for "Buster Cube" pet toy.

* cited by examiner

Primary Examiner—Charles T. Jordan
Assistant Examiner—Bret Hayes
(74) Attorney, Agent, or Firm—Sheridan Ross P.C.

(57) ABSTRACT

An animal toy includes a plurality of irregular outer features to hold one or more animal treats which are placed within the irregular outer features. The features may be of varying sizes, shapes, and combinations so that treats are held at varying depths therein. The animal toy may have a hollow core to further receive animal treats, or to receive a buoyant material allowing the animal toy to float. The treats may be held in the irregular outer features by friction or adhesion. The irregular outer features further serve to increase contact with the animal's mouth thereby also increasing the cleaning action of the animal toy with respect to the animal's teeth and gums. The animal toy can be made of a desired resilient flexible material which enhances dental cleaning.

46 Claims, 2 Drawing Sheets

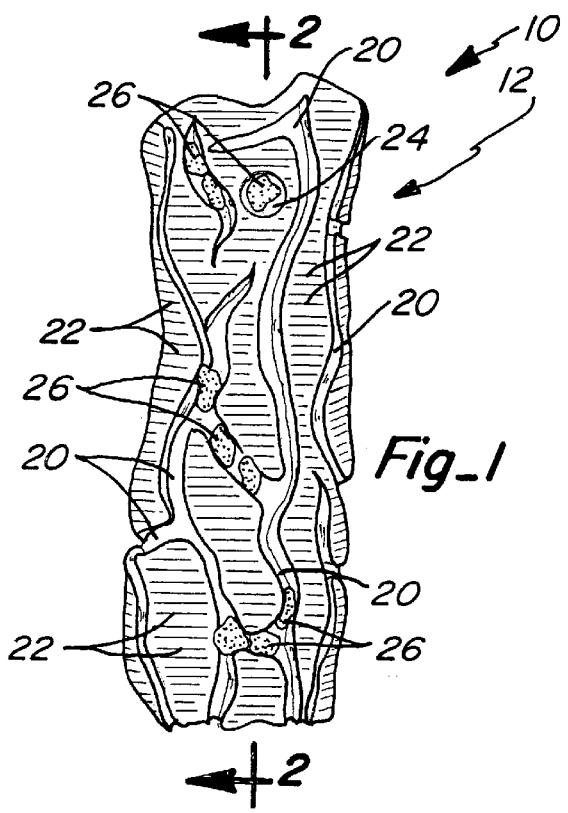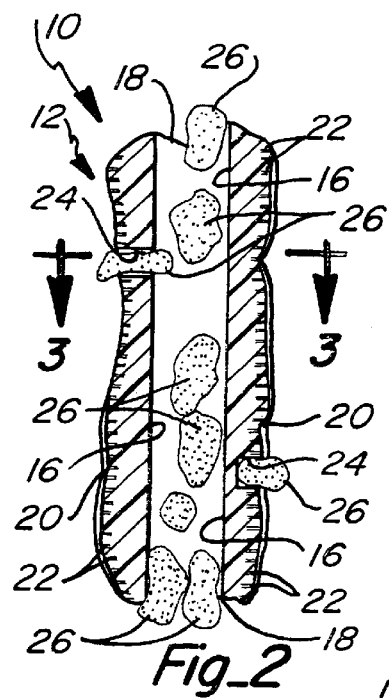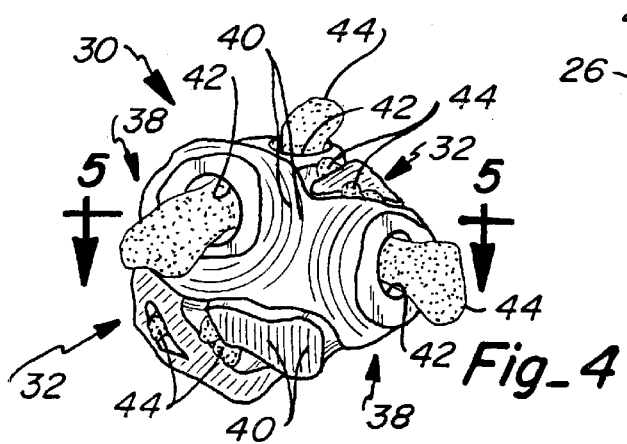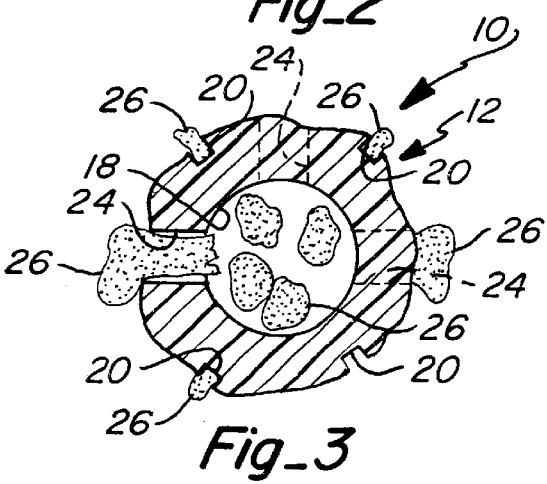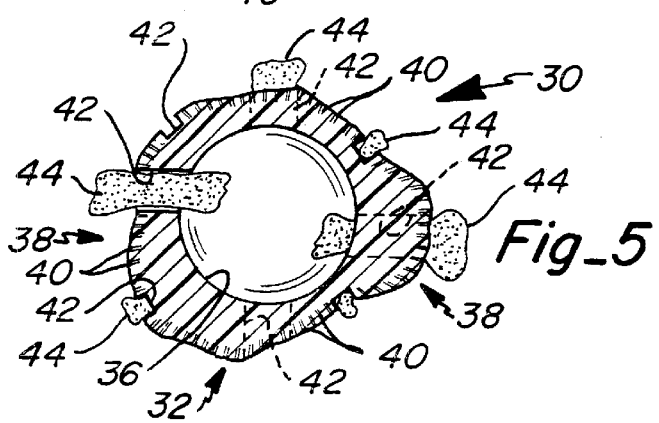

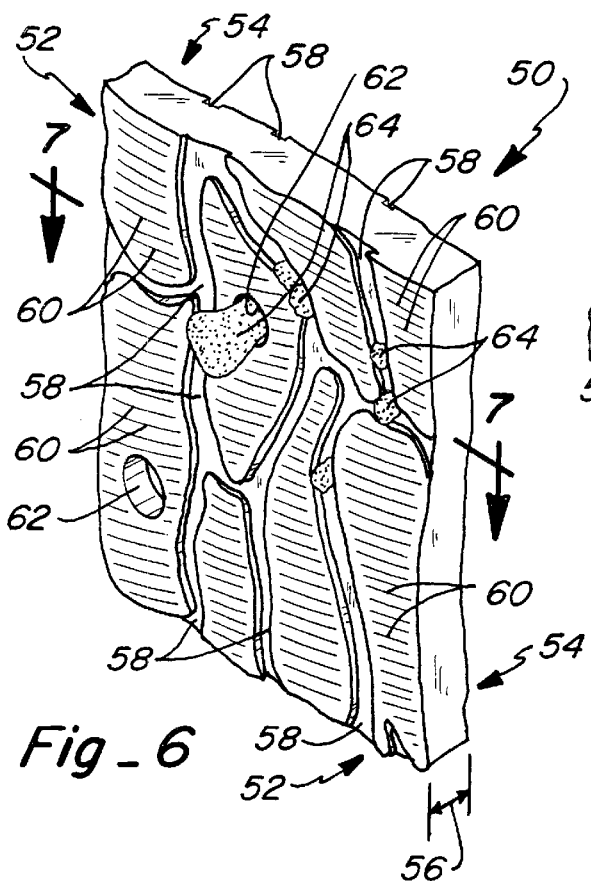
Fig_6
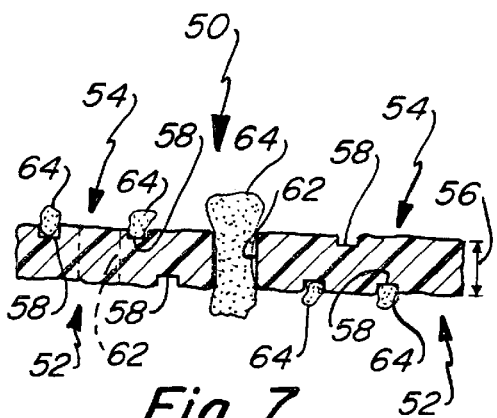
Fig_7
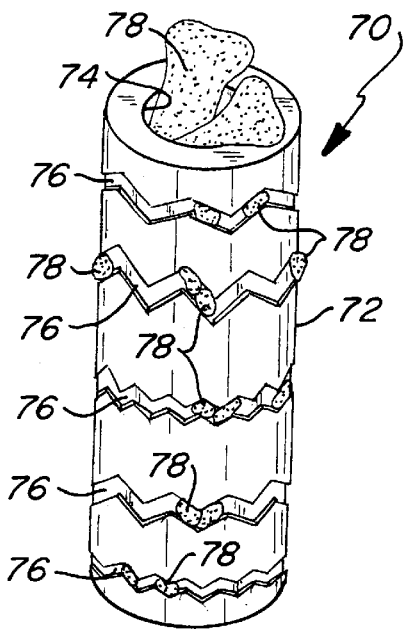
Fig_8
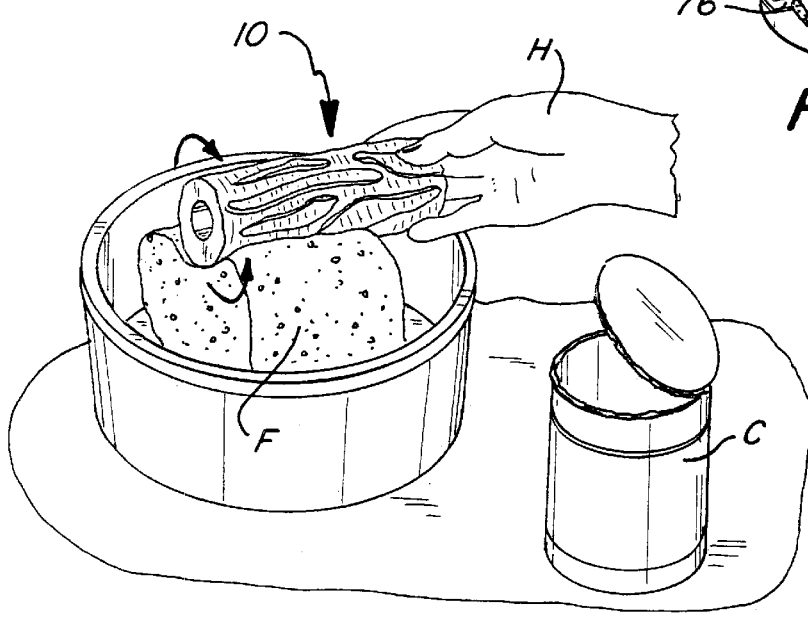
Fig_9

ND OCS 6,546,896 B1

ANIMAL TOY

TECHNICAL FIELD

This invention relates to an animal toy and, more particularly, to an animal toy having a plurality of irregular features on an outer surface thereof which stimulates dental cleaning of the animal's teeth and gums, and further allows for treats to be placed in the irregular features to encourage an animal's interaction with the animal toy.

BACKGROUND ART

Chewable pet toys have been available for many years. Many are impregnated with odors or flavoring materials which are attractive to the animal for which the toy is intended. These toys can be made of various materials, such as rawhide, rubber and plastic. The shortcoming of many of these products is that after a period of time, the flavor and/or odor becomes less strong and the animal loses interest in the toy. No means is provided for subsequently enhancing the flavor and odor of the toy.

Additionally, many toys which are impregnated with the odors or flavorings are not intended to be consumed by the animal. However, because of the stimulation provided to the animal, it may consume the entire pet toy which may cause the animal to choke or to experience fatal gastrointestinal problems by ingesting the toy.

Tay (U.S. Des. Pat. No. 188,179) discloses a pet food holder which has a hollow center for holding food.

Allis (U.S. Pat. No. 1,149,170); Jones (U.S. Pat. No. 260,851); and Edwards (U.S. Pat. Nos. 4,513,014 and 4,557,219) each disclose a pet toy having a flavoring material impregnated therein.

Fisher (U.S. Pat. No. 3,104,648) discloses a pet toy which is odor impregnated.

Markham (U.S. Pat. No. Re. 34,352) discloses a therapeutic pet toy having parallel peripheral grooves in which oral hygiene substances may be placed.

Axlerod (U.S. Pat. No. 3,871,334) and Miller (U.S. Pat. Nos. 3,899,607 and 4,032,665) each disclose pet toys which are both flavor and odor impregnated.

Jungle Talk International sells a product for birds made of wood which has openings in which nuts are firmly fixed. The bird must substantially destroy the wood in order to reach the nuts. Thus, the product cannot be reloaded and reused.

A product known as a "Buster Cube" has an opening in which dry dog food is poured. As a dog knocks it over in playing with it, the food runs out so that the dog can eat it.

Although each of these inventions is suitable for its intended purpose, none provides means on the exterior surface thereof for holding animal treats to help keep the animal interested in the toy.

DISCLOSURE OF THE INVENTION

In accordance with the present invention, an animal toy is provided having a plurality of irregular features formed on the outer surface thereof. The animal toy has many benefits to an animal which chews on the animal toy. First, the irregular features provide for a multitude of different contact surfaces which allows the gums and teeth of the animal to be cleaned while chewing on the toy. Second, the irregular features allow many different types of food treats to be placed within and around the irregular features which further enhance an animal's desire to chew on the animal toy. Thus, while the external appearance of the animal toy has a pleasing shape and has many aesthetic characteristics, the irregular features also have useful purposes as well.

The animal toy is made of a resilient flexible material which prevents it from being destroyed when chewed on by the animal. Therefore, treats can be replaced as desired in the animal toy without having to also replace the animal toy. The resilient flexible material also provides options for determining how hard an animal must bite down on the animal toy or otherwise deform the animal toy in order to dislodge a treat.

Also, the selection of the type of resilient flexible material partially determines the type of dental cleaning action which occurs. Thus, it is contemplated within the spirit and scope of this invention that the degree of resiliency of the material making up the animal toy can be varied to achieve the desired effect on the animal's mouth for dental cleaning and to achieve the desired effect for occupying the animal while the animal attempts to remove treats.

In a first embodiment of the invention, the animal toy resembles a tree stick or branch including an outer surface resembling bark of the tree stick. The first embodiment has a substantially cylindrical shape with a hollow core which extends along a longitudinal axis substantially the entire length of the animal toy. The plurality of irregular features found on the outer surface can be categorized into three major groups, namely, channels, recesses, and grooves. As used herein, the "channels" refer to the features on the outer surface of the animal toy which run primarily longitudinally along the outer surface of the animal toy wherein at least some of the channels are interconnected. The channels extend in winding or sinuous patterns along the outer surface of the animal toy. The "recesses" refer to the substantially round shaped openings or holes which may be formed on the outer surface of the animal toy. These holes or openings can extend completely through the outer surface thus communicating with the hollow core, or may only extend partially through the outer surface. The "grooves" refer to those irregular features on the outer surface of the animal toy which are small cuts or indentations in the outer surface of the animal toy and which provide a roughened texture. These grooves are substantially lesser in depth than the channels and recesses.

In the first embodiment, each of these irregular features may be incorporated on the outer surface, or only selected ones of the three features can be incorporated. These irregular features are adapted to receive a wide array of animal treats. These treats can be held by friction or adhesion to the animal toy. The term "treat" as used herein is intended to include any items which are attractive to or consumed by an animal. Thus, treats might include catnip or edible material such as dry pet food, canned pet food otherwise known as wet pet food, or any other type of animal treats which are normally sold as such for consumption by an animal. Because of the different irregular features which may be formed on the outer surface of the animal toy, treats which are secured to the animal toy may be more or less difficult for the animal to extract. As the animal chews on the animal toy, use of the treats further enhances the animal's interaction with the animal toy such that an increased number of the animal's tooth surfaces as well as gum surfaces come into contact with the animal toy for dental cleaning. Also, because some treats will be more difficult for the animal to remove than others, the animal can be kept occupied for several hours before treats need to be replaced.

In a second preferred embodiment, instead of a tree stick-shaped toy, the animal toy is substantially rounded in shape having the general appearance of a knot on a tree limb. In this second embodiment, in lieu of grooves, an additional category of irregular features incorporated on the outer surface includes a plurality of "protrusions" or mounds which extend away from the geometric center of the animal toy.

In a third preferred embodiment, the animal toy may take the form of a substantially planar or sheet-like configuration which includes the irregular outer features of the first or second embodiments, or a combination of both.

In yet another embodiment, the animal toy is substantially cylindrical in shape also having a length extending along a longitudinal axis, and further includes a plurality of geometric designs on the outer surface thereof which also can serve to hold a wide array of treats as with the other embodiments.

Also disclosed is a method of entertaining an animal which focuses on the animal's efforts to extract or dislodge the treats secured to the animal toy. Further, a method is disclosed of securing food treats to an animal toy wherein the animal toy is rolled or dragged over an animal treat which has a paste-like consistency whereby the treat adheres to the outer surface of the animal toy.

Additional advantages will become apparent from the description which follows, taken in conjunction with the accompanying drawings.

BRIEF DESCRIPTION OF THE DRAWINGS

FIG. 1 is a perspective view of the first embodiment of the animal toy of this invention,;

FIG. 2 is a vertical section, taken along line 2—2 of FIG. 1;

FIG. 3 is a horizontal section, taken along line 3—3 of FIG. 2;

FIG. 4 is a perspective view of the second preferred embodiment of the invention;

FIG. 5 is a horizontal section, taken along line 5—5 of FIG. 4;

FIG. 6 is a perspective view of a third embodiment of the animal toy of this invention;

FIG. 7 is a horizontal section, taken along line 7—7 of FIG. 6;

FIG. 8 is a perspective view of a fourth preferred embodiment of this invention, and FIG. 9 is a perspective view of the first embodiment of this invention as it is used to conduct the method of securing food treats in accordance with the method of this invention.

DETAILED DESCRIPTION OF THE DRAWINGS

In accordance with the invention, an animal toy in the first embodiment is shown at FIG. 1. The animal toy 10 has an outer surface 12 with a plurality of irregular features formed thereon. As shown in FIG. 2, an inner surface 16 defines a substantially cylindrical hollow core which extends longitudinally through the animal toy 10. Accordingly, each opposite end of the animal toy 10 has corresponding end openings 18.

The irregular features formed on the outer surface 12 of the animal toy 10 can be generally categorized as channels 20, grooves 22, and recesses 24. Referring back to FIG. 1, the channels 20 form an irregular pattern on the outer surface 12 of the animal toy 10, and wherein some of the channels 20 are interconnected to one another at different points of intersection along the outer surface 12. Accordingly, the channels delineate or form a corresponding irregular pattern of islands or peninsulas which are raised in comparison to the channels 20 which extend toward the hollow core. An island can be defined as a feature which is completely surrounded by one or more channels, and a peninsula can be defined as a feature which is partially surrounded by one or more channels. The shapes of the islands and peninsulas are defined by the channels which surround them. The plurality of grooves 22 are formed on the pattern of islands/peninsulas of the outer surface 12. As shown, these grooves 22 extend primarily perpendicular to the longitudinal axis of the animal toy 10; however, it shall be understood that the grooves 22, as well as the channels 20 may extend in any direction or pattern on the outer surface of the animal toy. The grooves 22 provide texture or roughness to the outer surface 12 of the animal toy. A plurality of recesses 24 are also formed on the outer surface of the animal toy. As shown, the recesses 24 may extend completely through the outer surface communicating with the hollow core or the recesses 24 may extend only partially through the outer surface. The recesses 24 may be scattered in an irregular fashion along the outer surface 12 of the animal toy. A number of different types of animal treats 26 may be secured to the animal toy. As shown in FIG. 1, treats 26 may be placed in the channels 20, and/or may be placed within the recesses 24. The treats 26, as shown in FIGS. 1 and 2, could be, for example, dry dog food which is sized to fit in the channels and recesses. As further shown in FIGS. 2 and 3, additional animal treats 26 may be placed within the hollow core and wedged therein in such a manner that the animal has to work to dislodge the treats.

Because of the irregular features on the surface of the animal toy, an animal chewing on the toy will increase contact with the different tooth surfaces as well as make contact with the gums for gum massage. Thus, in general, the irregular features on the outer surface of the animal toy have greatly beneficial therapeutic purposes for cleaning the animal's mouth.

The animal toy of this invention can be made of a desired resilient flexible material which prevents the animal toy from being consumed by the animal, and also helps to achieve the desired type of dental cleaning action in the animal's mouth. The animal toy could be made of a material flexible enough that when the animal bites down on the animal toy, the various grooves or recesses collapse around the animal's teeth and gums allowing the desired cleaning action. Alternatively, the animal toy can be made of a less resilient flexible material which still deforms in response to the biting action of the animal but does not as easily collapse around the animal's mouth during biting. The animal toy may be made of a flexible plastic or rubber material which achieves the desired type of cleaning action.

FIGS. 4 and 5 illustrate a second embodiment of the animal toy of this invention. As shown in FIG. 4, the animal toy 30 also has an outer surface 32 with a plurality of irregular features. As seen in FIG. 5, an inner surface 36 defines a hollow core. The animal toy of FIGS. 4 and 5 is rounded in shape. The irregular features of the second embodiment include a plurality of protrusions or mounds 38, grooves 40, and recesses 42. The grooves 40 and the recesses 42 are incorporated into the second embodiment in the same way as the grooves 22 and recesses 24 are used in the first embodiment. The second embodiment also shows the plurality of protrusions 38 which constitute irregular extensions or mounds which extend away from the hollow core. As shown, the recesses 42 may be centered on these protrusions 38 as desired. A plurality of animal treats 44 are also secured to the animal toy 30 such that an animal has different degrees of difficulty in removing the treats therefrom. As with the first embodiment, the irregular shape and irregular outer features of the second embodiment help to clean the tooth surfaces of the animal as well as to massage the animal's gums. Additionally, it is contemplated that animal treats could be placed within the hollow core of the second embodiment which would further add a degree a difficulty for the animal to remove the treats therein.

FIGS. 6 and 7 illustrate a third embodiment of the invention. In this embodiment, the animal toy 50 is a substantially planar or sheet-like configuration. The animal toy 50 has a first side 52, and a second side 54. One or both of these sides may have the irregular features formed on the respective outer surfaces thereof. The animal toy 50 may be made to a desired thickness 56 based upon the type of animal which will encounter the animal toy 50. In this third embodiment, the irregular outer features resemble those used on the first embodiment. Specifically, the irregular outer features shown in this third embodiment include a plurality of channels 58, grooves 60, and recesses 62. The arrangement and functioning of these irregular outer features are the same as discussed above with respect to FIG. 1. Further shown are treats 64 secured within the irregular features. However, because of the planar or sheet-like configuration of the third embodiment, an animal may encounter yet a different type of biting action on the animal toy. For example, treats placed more interiorly of the outer edges of this third embodiment would require an animal, in order to dislodge these interior food treats, to more fully insert the animal toy within the mouth. The third embodiment, as with the previous embodiments, can be made of a flexible material which may or may not allow the third embodiment to be folded over during the biting action of the animal. Particularly if the third embodiment is rigid enough so that it is difficult to fold, then this would require the animal to more fully insert this third embodiment within its mouth to reach the interiorly positioned treats. Although the third embodiment is shown in a rectangular shape, it can be made into any desired shape.

FIG. 8 illustrates yet another embodiment of the animal toy of this invention. In the case of FIG. 8, the animal toy 70 is substantially cylindrical in shape having an outer surface 72, and an inner surface 74 defining a substantially cylindrical hollow core. In this embodiment, the irregular features include a plurality of geometric channels 76 which extend or traverse substantially perpendicular to the longitudinal axis of the animal toy. These channels 76 may be made of differing depths, thus allowing food treats 78 to be placed therein which are made more or less difficult to extract by the animal depending upon the depth of the particular channel 76. As also shown, treats 78 may be wedged within the hollow core.

Although each of the foregoing embodiments illustrates an animal toy which has a hollow core or center, it shall be understood that each of above embodiments can also be of a solid form without a hollow core or center. Accordingly, the type of material selected for use can be resilient enough that the animal can bite down on the animal toy and still achieve the desired dental cleaning action. The hollow core or center makes the animal toy more easily deformable in response to the biting action of the animal.

FIG. 9 illustrates use of the embodiment of FIG. 1 in achieving the method of securing food treats to an animal toy in accordance with the method of this invention. As shown, canned or wet pet food F is removed from its can C. The animal toy 10 can be held by the hand H and then rolled or dragged across the food F. The paste-like consistency of the food F naturally causes it to adhere to the animal toy 10 wherein the food F occupies the numerous spaces or gaps on the outer surface of the animal toy. Depending upon the force or pressure which is exerted on the animal toy 10, the food F adheres to the animal toy within the irregular features. Once the animal toy is presented to the animal and the animal removes or extracts the food F from the animal toy, the food may be replenished in the same manner as discussed immediately above. In addition to wet pet food, the method of this invention can be achieved with other types of animal treats such as dry pet food. Accordingly, an amount of dry pet food can be spread out over a surface, and then the animal toy may be rolled over the dry pet food wherein some of the pieces of dry pet food will become embedded within the various irregular outer features on the animal toy. Depending upon the type of dry pet food used, along with the force exerted upon the animal toy, a desired number and amount of food treats will become embedded within the irregular outer features of the animal toy. Of course, each individual food treat may be individually placed within selected irregular outer features of the animal toy, as determined by the owner. Therefore, while dry or nugget-type treats are easily used within the animal toy of this invention, so, too, are wet or paste-like animal food or treats.

Although each of the embodiments of this invention has been shown as having hollow cores, it is also contemplated that the animal toy of this invention may be filled with a material enabling the animal toy to float. For example, a buoyant Styrofoam®-like material could be placed within the hollow core of the animal toy in order to allow the animal toy to float. Such a buoyant material could be sized to still allow various treats to be placed within the various irregular outer features of the various embodiments of this invention to include recesses which communicate with the hollow core.

Although separate embodiments have been illustrated with corresponding irregular features, it is to be understood that some or all of the irregular features of the various embodiments may be incorporated within a single animal toy. For example, the geometric channels 76 shown in FIG. 8 could also be incorporated into any of the other embodiments. Similarly, the bark-like irregular outer features which are illustrated in FIG. 1 may also be incorporated into the embodiment shown in FIG. 8.

Also in accordance with this invention, a method is provided for entertaining an animal. According to this method, an animal toy is provided having the structural features as discussed above with respect to the various embodiments. Pet treats are placed within the irregular features so as to be retained therein until the dislodged by the animal. Because of the varying degree of difficulty which an animal will experience in removing the treats, an animal is entertained over a desired period of time. The treats can be reloaded to entertain the animal a desired period of time.

From the foregoing, the advantages of the present invention are readily apparent. An animal toy having various configurations or shapes is provided which has irregular outer features of varying sizes, shapes and depths for releasably receiving one or more animal treats. Because of the varying shapes, sizes and depths of the irregular outer features, the animal will experience differing degrees of difficulty in removing the treats from the pet toy product. Additionally, because of the differing irregular outer features, the mouth of the animal will become better cleaned. Furthermore, the use of animal treats in the animal toy enhances the ability of the toy to keep an animal occupied for extended periods of time. Although the animal toy of this invention has been described more particularly for use with animals such as dogs or cats, it should also be understood that the animal toy can be used with birds or any other animal wherein treats are provided to attract the particular animal. For birds, the animal owner can place treats such as nuts or other snacks attractive to the birds in the various irregular outer features of the animal toy. In other words, any snack to which a particular animal is attracted can be placed in the various irregular outer features. Since the animal toy is not destroyed by the removal of the treats, the toy can be reloaded with additional treats for reuse.

This invention has been described in detail with reference to particular embodiments thereof, but it will be understood that various other modifications can be effected within the spirit and scope of this invention.

What is claimed is:

1. An animal toy comprising:
   a body member having an outer surface, and an inner surface defining a hollow core; and
   a plurality of features formed on said outer surface, said plurality of features comprising a plurality of channels having irregular curved shapes and varying lengths and widths, said plurality of channels extending inwardly from said outer surface toward said hollow core, said plurality of features extending along said outer surface in a non-uniform irregular pattern wherein at least some of said channels are interconnected along said outer surface, said plurality of features further comprising at least one recess extending at least partially through said outer surface of said body member and axially toward said hollow core.

2. An animal toy, as claimed in claim 1, further including:
   a plurality of grooves formed on said outer surface adjacent said plurality of channels.

3. An animal toy, as claimed in claim 1, wherein:
   said body member is substantially cylindrical shaped.

4. An animal toy, as claimed in claim 1, wherein:
   said hollow core extends longitudinally and completely through said body member.

5. An animal toy, as claimed in claim 1, wherein:
   said at least one recess extends completely through said outer surface in communication with said hollow core.

6. An animal toy, as claimed in claim 1, further comprising:
   a treat positioned in said at least one recess.

7. An animal toy, as claimed in claim 1, further comprising:
   at least one treat positioned in one of said plurality of channels.

8. An animal toy, as claimed in claim 6, wherein:
   said treat conforms in size to said at least one recess.

9. An animal toy, as claimed in claim 7, wherein:
   said treat conforms in size to said one of said plurality of channels.

10. An animal toy, as claimed in claim 1, further comprising:
    at least one treat placed in said hollow core.

11. An animal toy, as claimed in claim 1, wherein:
    said body member is made of a flexible material.

12. An animal toy, as claimed in claim 10, wherein:
    said treat conforms in size to an opening defined by said hollow core.

13. An animal toy comprising:
    a body member having an outer surface, and an inner surface defining a hollow core; and
    a plurality of features formed on said outer surface, said plurality of features comprising a plurality of protrusions extending away from said hollow core, said protrusions being delimited by a plurality of channels formed on said outer surface, said channels having irregular curved shapes and varying lengths and widths, at least some of said channels being interconnected along said outer surface, said plurality of features further including at least one recess extending at least partially through said outer surface and axially toward said hollow core.

14. An animal toy, as claimed in claim 13, wherein said plurality of features further includes:
    a plurality of grooves formed on said plurality of protrusions.

15. An animal toy, as claimed in claim 13, wherein:
    said at least one recess is positioned on one of said plurality of protrusions.

16. An animal toy, as claimed in claim 13, wherein:
    said body member is rounded in shape.

17. An animal toy, as claimed in claim 13, wherein:
    said at least one recess extends completely through said outer surface in communication with said hollow core.

18. An animal toy, as claimed in claim 13, further comprising:
    a treat positioned in said at least one recess.

19. An animal toy, as claimed in claim 18, wherein:
    said treat conforms in size to said one recess.

20. An animal toy, as claimed in claim 18, wherein:
    said treat extends completely through said outer surface in communication with said hollow core.

21. An animal toy, as claimed in claim 13, wherein:
    said body member is made of a flexible material.

22. An animal toy comprising:
    a body member having an outer surface and a center; and
    a plurality of features formed on said outer surface, said plurality of features comprising a plurality of channels having irregular curved shapes and varying lengths and widths, said plurality of channels extending inwardly toward said center of said body member, and said plurality of features extending along said outer surface in a non-uniform irregular pattern wherein at least some of said channels are interconnected along said outer surface.

23. An animal toy, as claimed in claim 22, further including:
    a plurality of grooves formed on said outer surface adjacent said plurality of channels.

24. An animal toy, as claimed in claim 22, wherein:
    said body member is substantially cylindrical shaped.

25. An animal toy, as claimed in claim 22, wherein:
    a hollow core extends longitudinally and completely through said body member.

26. An animal toy, as claimed in claim 22, further comprising:
    at least one treat positioned in one of said plurality of channels.

27. An animal toy, as claimed in claim 25, wherein:
    said treat conforms in size to said one of said plurality of channels.

28. An animal toy, as claimed in claim 22, wherein:
    said body member is made of a flexible material.

29. An animal toy comprising:
a body member having a substantially planar shape, and first and second sides; and
a plurality of irregular features formed on said first and second sides, said plurality of irregular features comprising a plurality of channels, each of said plurality of channels extending at least partially through said body member, said plurality of irregular features further comprising at least one recess extending at least partially through said body member.

30. An animal toy, as claimed in claim 29 further including:
a plurality of grooves formed on at least one side of said first and second sides adjacent said plurality of channels.

31. An animal toy, as claimed in claim 29, wherein:
at least some of said channels are interconnected along said at least one side of said first and second sides.

32. An animal toy, as claimed in claim 29, wherein:
said at least one recess extends completely through said body member.

33. An animal toy, as claimed in claim 29, further comprising:
at least one treat positioned in said at least one recess.

34. An animal toy, as claimed in claim 29, further including:
at least one treat positioned in one of said plurality of channels.

35. An animal toy, as claimed in claim 29, wherein:
said body member is made of a flexible material.

36. An animal toy having an outer surface, the improvement comprising:
a plurality of interconnecting and curved shaped channels formed on said outer surface, said channels further having varying widths and lengths and at least some of said channels being interconnected along said outer surface;
at least one island and/or peninsula formed on said outer surface and defined in shape by at least one channel of said plurality of interconnecting channels which at least partially surrounds said at least one island and/or peninsula; and
a plurality of grooves formed on said at least one island and/or peninsula, said plurality of grooves having corresponding widths which are less than said widths of said channels.

37. An animal toy, as claimed in claim 36, wherein:
said at least one island and/or peninsula is a plurality of islands and/or peninsulas.

38. An animal toy, as claimed in claim 36, wherein:
said channels are sinuous.

39. An animal toy, as claimed in claim 36, wherein:
said outer surface is curved.

40. An animal toy, as claimed in claim 36, wherein:
said animal toy has a hollow center.

41. An animal toy, as claimed in claim 38, wherein:
said outer surface is cylindrical so that said animal toy resembles a tree limb.

42. An animal toy, as claimed in claim 38, wherein:
said animal toy has a longitudinal axis, and said channels extend substantially parallel to said axis; and
said grooves extend substantially laterally to said axis.

43. An animal toy, as claimed in claim 38, wherein:
said outer surface is knobby so that said animal toy has the general appearance of a knot in a tree limb.

44. An animal toy, as claimed claim 38, wherein:
said outer surface is substantially planar.

45. An animal toy, as claimed in claim 38, wherein:
said grooves extend substantially transversely to said channels.

46. An animal toy, as claimed in claim 38, further including:
a least one pet treat placed in at least one of said channels; and
at least one pet treat placed in at least one of said grooves.

* * * * *